United States Patent [19]

Yamada

[11] 3,967,612

[45] July 6, 1976

[54] LUBRICATING OIL PUMP FOR USE IN AN INTERNAL COMBUSTION ENGINE

[75] Inventor: Seiichiro Yamada, Shizuoka, Japan

[73] Assignee: Yamaha, Hatsudoki Kabushiki Kaisha, Japan

[22] Filed: Mar. 12, 1974

[21] Appl. No.: 450,359

[30] Foreign Application Priority Data
Mar. 14, 1973 Japan.............................. 48-29774

[52] U.S. Cl............................ 123/196 CP; 417/461; 184/33; 184/31
[51] Int. Cl.² .......................................... F01M 1/00
[58] Field of Search ............ 417/461, 493, 494, 401; 123/196 R, 196 CP, 196 M; 184/33, 31, 35, 6.28, 27 R

[56] References Cited
UNITED STATES PATENTS 2,959,164  11/1960  Janevay ........................ 123/196 CP
RE792      3/1960   Dalrymble ..................... 123/196 CP FOREIGN PATENTS OR APPLICATIONS
257,980    9/1926   United Kingdom........... 123/196 CP Primary Examiner—Charles J. Myhre
Assistant Examiner—R. H. Lazarus
Attorney, Agent, or Firm—Spensley, Horn & Lubitz

[57] ABSTRACT

A lubricating oil pump which is responsive to the engine load to supply an associated internal combustion engine with an optimum quantity of lubricating oil. The lubricating oil pump determines the oil outlet frequency depending on the engine speed and determines the supply quantity of oil depending on the variation in the engine pressure.

11 Claims, 4 Drawing Figures

LUBRICATING OIL PUMP FOR USE IN AN INTERNAL COMBUSTION ENGINE

BACKGROUND OF THE INVENTION

1. Field of the Invention

This invention relates to a lubricating oil pump for use in an internal combustion engine which can feed a varying quantity of lubricating oil in response to the engine load.

2. Description of the Prior Art

The quantity of lubricating oil required by an internal combustion engine generally varies in proportion to the engine speed and engine load. A too small quantity of lubricating oil will cause an engine seizure; while an excessive quantity of lubricating oil will result in various disadvantages, such as waste of oil, air pollution and failure of smooth engine operation due to deposition of carbon and excessive oil onto the sparking plug and walls of the combustion chamber.

A conventional lubricating oil pump for use in an internal combustion engine is provided with a plunger which is forced to reciprocate by means of a cylindrical cam member. The plunger has a stroke which varies depending on the throttle angle, so that a sufficient quantity of lubricating oil can be supplied even under such conditions where the throttle valve is full-opened.

It is desirable to vary the supply quantity of lubricating oil in response to depending on the engine load. In the conventional lubricating oil pump, however, the plunger stroke is predetermined on the one hand by the cylindrical cam member. This means that to increase the plunger stroke the cylindrical cam member must be made large in size. In contrast, in a conventional lubricating oil pump, the plunger stroke varies according to the throttle angle. The throttle angle, however, remains constant unless it is varied positively. Furthermore, since the plunger stroke cannot be varied in response to the engine speed, the quantity of lubricating oil fed out of the conventional lubricating oil pump remains constant even when a variation is encountered in the engine speed. The variation in the engine speed results in the variation in the output torque and, hence, the constant supply of lubricating oil is turned out to be either excessive or insufficient. An optimum oil supply cannot be attained especially when the engine under idling or low-load operation is accelerated rapidly.

SUMMARY OF THE INVENTION

It is known that the load applied to an internal combustion engine varies in proportion to the quantity of intake air and/or air-fuel mixture fed into the cylinder and that the maximum compression pressure within the combustion chamber of a two stroke cycle engine, four stroke cycle engine or rotary engine, as well as the maximum compression pressure within the crank case of a two stroke cycle engine varies in correspondence with said supply quantity of air and/or air-fuel mixture. The present invention contemplates a lubricating oil pump which can supply an optimum quantity of lubricating oil by varying the plunger stroke in response to the variation in said maximum compression pressure.

It is a primary object of this invention to provide a lubricating oil pump for use in an internal combustion engine, comprising a casing; movable means supported by the casing for reciprocating movement; pump means supported by the casing and connected to the movable means so that it is operative in response to the reciprocation of the movable means; a passage for communicating the variation in the engine pressure into a gas chamber defined by said movable means and casing; a one-way valve arranged in the passage; and a distributor connected to the engine and operative in response to the engine speed to open and close a portion of the passage between said one-way valve and gas chamber, so that the outlet oil quantity from the pump means is controlled in response to the engine load and the pump means is intermittently driven at a frequency proportional to the engine speed, thereby supplying an optimum quantity of lubricating oil as the operational conditions of the engine vary over a wide range.

The second object of this invention is to provide a lubricating oil pump for use in an internal combustion engine, wherein said passage consists of first and second passages for communicating, respectively, the positive and negative pressures developed within the engine into said gas chamber; said one-way valve includes a first one-way valve arranged in said first passage to communicate only into said gas chamber and a second one-way valve arranged in said second passage to communicate only into the engine; and said distributor is so designed as to communicate said first and second passages alternately into the gas chamber at a time interval greater than the rotational cycle of the engine, so that the quantity of lubricating oil supplied per one cycle of pump operation can be increased, thereby improving the accuracy in oil metering and the durability of the entire device.

The third object of this invention is to provide a lubricating oil pump for use in an internal combustion engine, wherein said casing is provided with a first air port for communicating the gas chamber with atmosphere by way of the distributor; said distributor is so designed as to communicate the gas chamber into the first passage, second passage and first air port, in this order; and said movable means is elastically supported, under free conditions, in a preselected reciprocating position by means of an elastic member which is supported at one end by the casing, thereby adjusting the stroke of gas piston for each cycle of operation to control the supply quantity of lubricating oil.

The fourth object of this invention is to provide a lubricating oil pump for use in an internal combustion engine, wherein said distributor is a single valve body having a simple construction rotatably inserted into said casing so that it is driven by the engine at a reduced speed.

The fifth object of this invention is to provide a lubricating oil pump having a simple construction for use in an internal combustion engine, wherein said casing is provided with an oil inlet port, outlet port, a first air port, a first passage and a second passage, said oil inlet and outlet ports and first air port being open in the cylindrical inner wall surface of the casing; said distributor is rotatably inserted into said casing so that it is driven by the engine; said movable means is a piston which is axially slidable in contact with the cylindrical inner wall surface of said casing; and said elastic member is a spring.

The sixth object of this invention is to provide a lubricating oil pump for use in an internal combustion engine, wherein the pressure variation appearing in the inlet pipe of the engine is put into communication with the air chamber defined by said casing and the end surface of said movable means remote from said gas chamber, thereby increasing the gas piston stroke under engine braking operation to increase the supply quantity of lubricating oil.

The seventh object of this invention is to provide a lubricating oil pump for use in an internal combustion engine, wherein over the entire operation range of the gas piston the stroke thereof can be adjusted by externally adjusting the seat which is formed in the casing for the elastic member arranged between the gas piston and casing, thereby allowing to supply an optimum quantity of lubricating oil.

The eighth object of this invention is to provide a lubricating oil pump for use in an internal combustion engine, wherein a pressure accumulator chamber for storing the positive pressure and another pressure accumulator chamber for storing the negative pressure are arranged close to the gas chamber for thereby improve the operational response of the gas piston.

The ninth object of this invention is to provide a lubricating oil pump for use in an internal combustion engine, wherein a one-way valve is arranged in the passage connecting the inlet pipe of the engine with a third air chamber to prevent the pump from being operated when the negative pressure present in the intake air pipe is below the predetermined level.

These and other objects, features and advantages of this invention will become more apparent from the reading of the following detailed description.

DETAILED DESCRIPTION

Figure 1:
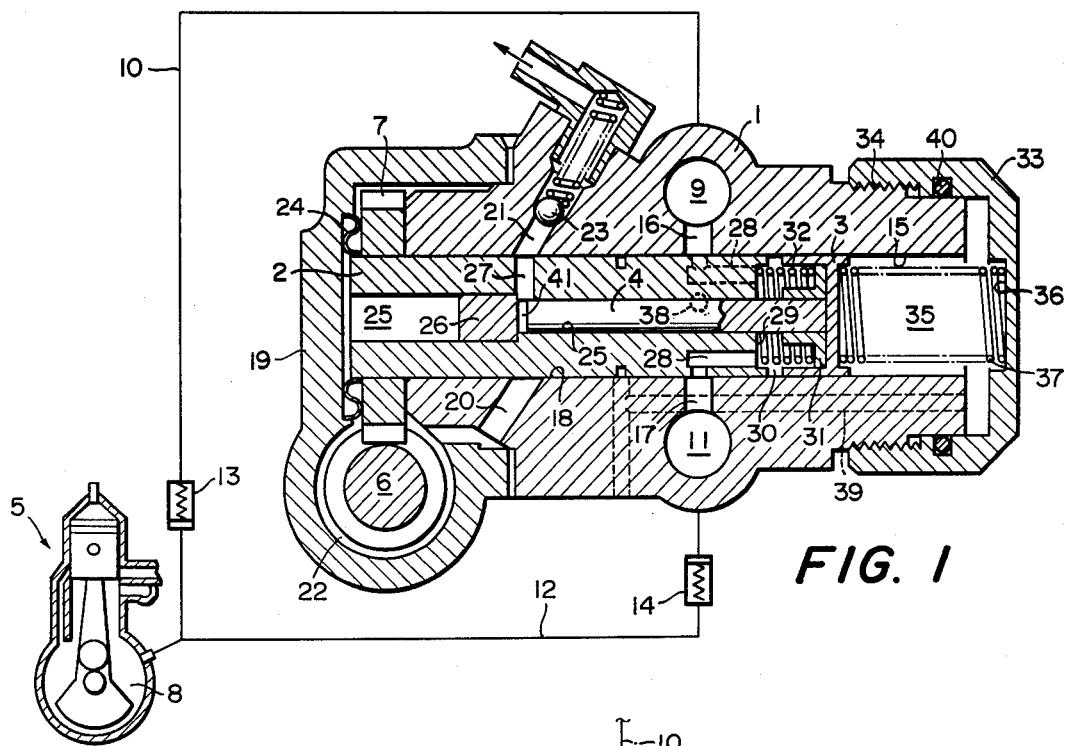
FIG. 1 is an axial sectional view of the lubricating oil pump according to the first embodiment of this invention.
Figure 2:
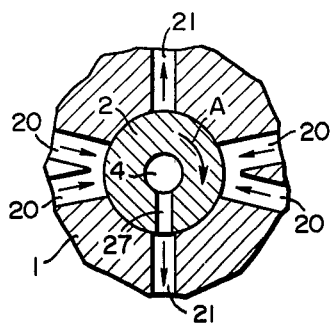
FIG. 2 is a schematic cross sectional view for explaining the relative position of the oil inlet and outlet ports formed in the pump and the oil inlet and outlet ports formed in the distributor.
Figure 3:
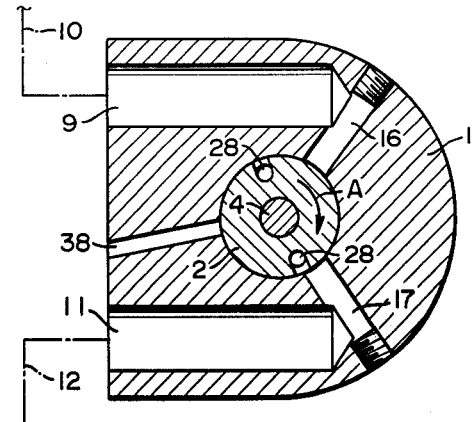
FIG. 3 is a schematic cross sectional view for explaining the relationship between the pressure passages for controlling the plunger stroke.

The invention will be described first with reference to FIGS. 1 to 3 illustrating the lubricating oil pump according to the first embodiment of this invention. The illustrated lubricating oil pump is for use in an internal combustion engine and comprising as its main components a casing 1; a distributor 2 rotatably mounted in said casing 1; a gas piston 3 axially slidable within said casing 1; a plunger 4 engaged with said gas piston 3 and reciprocally slidable within said distributor 2; a rotary worm 6 connected with a two stroke cycle internal combustion engine 5; a worm wheel 7 engaged with said worm 6 to rotate the distributor 2; a first passage 10 for communicating a crank chamber 8 with a first pressure accumulation chamber 9 defined within said casing 1; a second passage 12 for communicating the crank chamber 8 with a second pressure accumulation chamber 11; a first one-way valve 13 arranged in said first passage 10; and a second one-way valve 14 arranged in said second passage 12.

The casing 1 has a central bore 15 extending through the casing 1 along its axis. The central bore 15 has a cylindrical configuration having a uniform cross section and is defined at its both ends by planes intersecting the bore 15 at right angles. Within the casing 1 are formed first and second pressure accumulator chambers 9 and 11 at a substantially middle position of the axial length of the central bore 15. The first and second pressure accumulator chambers 9 and 11 are of cylindrical configuration having an axis extending perpendicularly to the central bore 15, and are arranged respectively above and below the central bore 15. A first and second gas ports 16 and 17 extend radially inwardly from the first and second pressure accumulator chambers 9 and 11, respectively, along a common plane intersecting the central bore 15 at right angles and are open into the central bore 15 at the internal surface 18 mentioned above. These gas ports 16 and 17 have axes intersecting each other on the axis of the central bore 15 at an angle of 120°. The first and second pressure accumulator chambers 9 and 11 are in communication with the crank chamber 8 of a two stroke cycle internal combustion engine 5 by way of the first and second passages 10 and 12, respectively. A first one-way valve 13 arranged in the first passage 10 is so designed as to open only in one direction, or as to communicate the crank chamber 8 with the first pressure accumulator chamber 9, when the pressure difference between these chambers 8 and 9 is larger than the predetermined value; while a second one-way valve 14 is so designed as to open in the opposite direction. A worm casing 19 is oil tight and attached to the end of the casing 1 on the side where the worm wheel 7 is mounted in the casing 1 so that the worm 6 is journalled in the worm casing 19. The casing has an oil inlet port 20 and an oil outlet port 21 which are open into the central bore 15 in the diametrically opposite positions and at a substantially equal distance from the pressure accumulator chambers 9 and 11 and the end of the casing 1 on the worm mounting side. The oil inlet port 20 in communication with a worm receiving space 22 defined in the lower position of the worm casing 19 and also in combination with an oil tank (not shown). In the position near the opening of the oil outlet port 21 into central bore 15 a one-wave valve 23 is arranged and is so designed as to open only in the oil discharging direction. The oil outlet port 21 is in communication with the lubricating sections (not shown) of the internal combustion engine.

To one end of the distributor 2 is fixedly mounted a disc-like worm wheel 7. The distributor 2 has an end portion remote from the worm wheel 7 inserted into the central bore 15 until the forward end of the distributor 2 passes over the open ends of the gas ports 16 and 17. The worm wheel 7 has one side surface engaged with the casing 1 and opposite side surface engaged with the worm casing 19 by means of a wave washer 24 interposed between them, so that both of the distributor 2 and worm wheel 7 are prevented from being axially displaced. The distributor 2 is provided with a cylindrical bore 25. Bore 25 includes a diametrically enlarged portion extending from the end nearest the worm wheel mounting for about one-third of the entire length of distributor 2. A stepped portion is formed at the position where the enlarged diameter portion terminates. Within the enlarged diameter portion of the bore 25 is inserted a stopper 26 until it is engaged with said stepped portion and forms an oil tight seal. An oil port 27 extends radially through the distributor 2, at a position close to said stepped portion, from the reduced diameter portion of the bore 25 to the outer circumferential surface of the distributor 2, so that it alternately communicates with the oil inlet port 20 and oil outlet port 21 as the distributor 2 rotates. In the forward end of the distributor 2 are formed a pair of through holes 28 in the diametrically opposite positions. Each of these through holes 28 is open at the outer circumferential surface of the distributor 2 in the position close to the forward end thereof as well as in the position slightly spaced from that forward end, so that these through holes 38 communicate alternately and intermittently with the gas ports 16 and 17 as the distributor 2 rotates. The cylindrical gas piston 3 at the position close to the forward end of the distributor 2. The gas piston 3 is slideably disposed along the access of central bore 15 cooperates with the inner wall surface 18 of the bore 15 and the forward end surface 29 of the distributor 2 to define a gas chamber 30. A plunger 4 having a cylindrical configuration substantially equal to the bore 25 is disposed within central bore 25, until the forward end of plunger 4 is substantially in contact with the stopper 26. In this position, the other end of the plunger 4 is slightly projected from the forward end of the distributor 2 and fixedly engaged with a spring seat 31 and gas piston 3. An axially compressible spring 32 is loaded between the spring seat 31 and the forward end surface 29 of the distributor 2. Over the end of the casing 1 remote from the worm 6 is mounted a casing cap 33 at the threaded portion 34 formed on the outer circumferential surface of the casing 1, so that a first air chamber 35 is defined by the inner wall surface of the central bore 15 and the end surface of the gas piston 3 facing toward the casing cap 33. In the inside surface of the casing cap 33 opposite to the central bore 15 is formed a spring seat portion 36. A spring 37 which is compressible in the axial direction of the central bore 15 is supported at one end by the end surface of the gas piston 3 close to the casing cap 33 and supported at the other end by the spring seat 36 formed in the casing cap 33. By rotating the casing cap 33 with respect to the casing 1, the pressing force of the spring 32 and 37 against the gas piston 3 can be adjusted and hence the position of the gas piston 3 is adjustable under conditions where no air pressure is applied thereto.

The casing 1 has a first air port 38 communicating the central bore 15 with atmosphere. The first air port 38 extends radially from the central bore 15 at an angle of 120° to both of said gas ports 16 and 17, in a common plane of these gas ports. The casing 1 also has a second air port 39 which communicates said first air chamber 35 with atmosphere.

The positional relationship of the oil port 27 and pair of through holes 28 formed in the distributor 2 with respect to the oil inlet port 20, oil outlet port 21, gas ports 16 and 17 and first air port 38 formed in the casing 1 is so selected that the oil inlet port 20 is in communication with the oil port 27 when the gas port 16 and first air port 38 are in communication with the through hole 28. Oil outlet port 21 is in communication with the oil port 27 when the gas port 17 is in communication with the through hole 28. The lubricating oil pump also includes an oil sealing O-ring indicated at 40.

Now the operation of the lubricating oil pump having the foregoing construction will be described. When the internal combustion engine starts operating, the worm 6 starts rotating. This forces the engaged worm wheel 7 as well as the distributor 2 to rotate at a considerably reduced speed. The distributor 2 rotates clockwise when viewed from the direction of the casing cap 33 (in FIGS. 2 and 3, in the direction of arrow A).

As the internal combustionn engine reaches a normal operational condition, the maximum compression pressure appearing in the crank chamber 8 increases. At this time, the one-way valve 13 arranged in the first passage 10 opens in the compression stroke, so that the air-fuel mixture having a positive pressure is supplied once in every cycle of the engine operation through the passage 10 into the first pressure accumulator chamber 9. Then, upon rotating the distributor 2 when the first gas port 16 is put into communication with the through hole 28, the gas having a positive pressure is allowed to flow from the first pressure accumulator chamber 9 into the gas chamber 30, thereby pushing the gas piston 3 toward the casing cap 33 until it reaches a position at which the sum of the gas pressure and the pressing force of the spring 32 balances with the pressing force of the spring 37. Under these conditions, the oil inlet port 20 is put into communication with the oil port 27. When the plunger 4 is pulled by the gas piston 3 out of the distributor 2, the volume of the oil chamber 41 defined by the inner wall surface of the distributor 2 as well as the opposite surfaces of the plunger 4 and stopper 26 is increased and the lubricating oil is sucked into this oil chamber 41 through the oil inlet port 20.

On the other hand, under operation of the internal combustion engine, the negative pressure developed in the crank chamber 8 is communicated into the second pressure accumulator chamber 11 by way of the second passage 12 and second one-way valve 14, so that the pressure within the second pressure accumulator chamber 11 becomes negative. Under these conditions, if the distributor 2 keeps rotating in response to the rotation of the internal combustion engine to put the second gas port 17 into communication with the air chamber 35 by way of the through hole 28, then the gas present within the gas chamber 30 is sucked into the second pressure accumulator chamber 11 and into the second passage 12. This forces the gas piston 3 to move toward the worm wheel 7 against the pressing force of the spring 32 and accordingly the plunger 4, pushed by the gas piston 3, moves toward the worm wheel 7 until the forward end of the plunger 4 is brought into contact with the stopper 26. Thus, the oil present within the oil chamber 41 is supplied into the internal combustion engine by way of the mutually communicating oil port 27, oil outlet port 21 and one-way valve 23.

When the distributor 2 further rotates until the through hole 28 is put into communication with the first air port 38, the pressure within the gas chamber 30 becomes equal to the atmospheric pressure and the gas piston 3 is set free. At this time the gas piston 3 as well as the plunger 4 moves toward the casing cap 33 until they reach a position at which the pressing force of the two springs 32 and 37 balance with each other, so that the lubricating oil is sucked into the oil chamber 41 by way of the mutually communicating oil inlet port 20 and oil port 27. When the first pressure accumulator chamber 9 is again put into communication with the gas chamber 30, the lubricating oil is further sucked into the oil chamber 41, and the foregoing operations are repeated sequentially in each cycle of pump operation.

However, under idling operation or engine braking operation, the air-fuel mixture fed into the internal combustion engine is reduced in quantity, and the pressure developed within the crank chamber 8 is shut off by the one-way valve 13 and cannot be stored in the first pressure accumulator chamber 9. Under these conditions, the oil fed into the oil chamber 41 in that cycle is limited to such a quantity that can be fed by the action of spring 32, i.e., by returning to the equilibrium position, when the gas chamber 30 is in communication with atmosphere by way of the first air port 38.

When the gap defined between the gas piston 3 and casing cap 33 is reduced by rotating the casing cap 33, the spring 37 applies an increasingly larger pressing force to the gas piston 3 in the direction toward the worm wheel 7. As a result, the stroke of plunger 4 is reduced over the entire operation cycle of the internal combustion engine and the quantity of oil supplied into the engine in reduced. Conversely, the quantity of oil to be supplied into the engine can be increased by widening the gas defined between the gas piston 3 and casing cap 33. The gradient of the plunger stroke (or gradient of the flow quantity of oil) with respect to the positive pressure can be determined by the difference between the spring constants of springs 32 and 37.

By the combination of these adjustments mentioned immediately hereinabove and the adjustment of pressure communication by means of the one-way valve, an optimum quantity of oil can be supplied under any various operational conditions of the engine.

Figure 4:
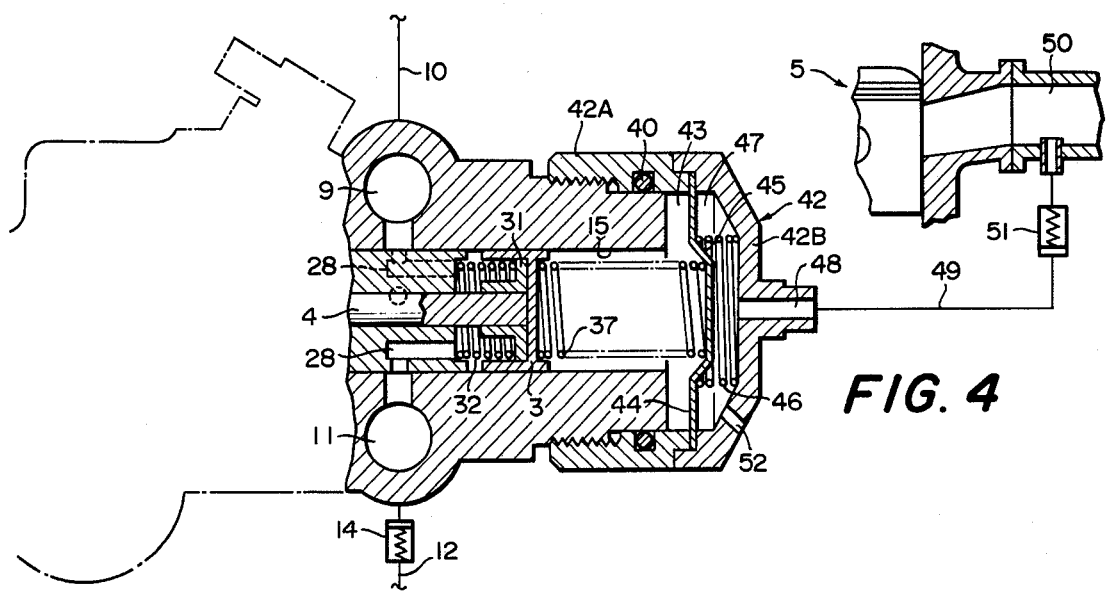
FIG. 4 is a partially fragmented elevational view of the lubricating oil pump according to the second embodiment of this invention.

Now, reference should be had to FIG. 4 illustrating the lubricating oil pump according to the second embodiment of this invention. According to this embodiment the lubricating oil pump is not provided with the second air port 39 of the first embodiment but includes a casing cap 42 having a different configuration. The casing cap 42 consists of a circular cylindrical member 42A having an internally threaded portion which can be mated over the external thread on the casing 1, and a cap 42B fixedly mounted on the other end of the cylindrical member 42A to thereby cover the corresponding end of the casing 1. To the connecting portion between the cylindrical member 42A and cap 42B is fixedly attached a disc-like diaphragm 44 which, in cooperation with the cylindrical member 42A, central bore 15 and the end surface of the gas piston 3 facing toward the cap 42B, defines an air tight second air chamber 43. In the center of the diaphragm 44 is formed a spring seat 45. Between the spring seat 45 and gas piston 3 is arranged a spring 46 which is axially compressible within the central bore 15. A third air chamber 47 defined by the cap 42B and diaphragm 44 is in communication with an inlet pipe 50 at a position downstream of the throttle valve (not shown) of the internal combustion engine 5, by way of a third air port 48 extending through the center portion of the cap 42B and a third passage 49 which is in communication with the third air port 48. In the third passage 49 is arranged a one-way valve 51 which communicates the third air chamber 47 into the inlet pipe 50. The cap 42B has a narrow passage 52 which communicates the third air chamber 47 with atmosphere. The other construction is substantially equal to the first embodiment.

Under normal operational conditions, the lubricating oil pump according to the second embodiment operates in a substantially similar manner to the first embodiment. However, under engine braking operation, a decreased positive pressure or no positive pressure is applied into the first pressure accumulator chamber 9 and, therefore, the lubricating oil circulating through the engine is limited to a certain quantity. Under these conditions, when the engine rotates at an increasingly higher speed, an increasingly larger quantity of oil has to be supplied into the engine per each cycle of operation. On the other hand, when the engine rotates at an increasingly higher speed, an increasingly larger negative pressure or partial vacuum is developed within the intake air pipe at a position downstream of the throttle valve.

Under the condition where the quantity of inlet air drawn through inlet pipe 50 is small compared to that normally attained at that engine speed (for example, under engine braking operation), the negative pressure or partial vacuum present within the inlet pipe 50 increases. This causes the one-way valve 51 to open, allowing the air present in the third air chamber 47 to flow into the inlet pipe 50. The pressure within the third air chamber 47 becomes negative, i.e., drops below atmospheric pressure, and the pressure within the second air chamber 43 is lowered by way of the diaphragm 44. Therefore, when the gas chamber 30 is put into communication either with the first air port 38 or with the first pressure accumulator chamber 9, the plunger stroke is increased compared with the first embodiment, thereby allowing the quantity of oil supplied into the internal combustion engine to be increased.

The air flows into the second air chamber 47 through a narrow passage 52 formed in the cap 42B. However, the inlet air is so small in quantity that it cannot cancel the positive pressure which is developed within the third air chamber 47 upon application of engine brake to the internal combustion engine. When the negative pressure present within the inlet pipe 50 is reduced, the one-way valve 51 shuts off and the pressure within the third air chamber 47 increases gradually to the atmospheric pressure as the air flows into the third air chamber 47 through the narrow passage 52.

In place of the third one-way valve 51 and narrow passage 52, a fixed valve having a small cross section may be arranged in the third passage 49 to attain the similar effects.

Although the invention has been described hereinbefore with reference to the embodiments utilizing the pressure variation in the crank chamber of a two stroke cycle engine, the pressure within the combustion chamber as well as the negative pressure of the intake air may also be utilized conveniently. Furthermore, these latter pressures can be used most conveniently, when the invention is applied to four stroke cycle engines or rotary piston engines.

What is claimed is:

1. In combination with an internal combustion engine having a crank chamber, a lubricating oil pump comprising:

a casing having a first cavity defined therein;
a distributor coupled to said internal combustion engine, said distributor being rotatably disposed within said first cavity of said casing, and having an axial cavity defined in said distributor;
pump means for drawing oil within a second cavity defined in part by said distributor and by said pump means, and for forcing oil from at least part of said second cavity, said pump means being disposed in said axial cavity of said distributor;
reciprocating means for imparting a reciprocating force to said pump means, said reciprocating means disposed within said first cavity of said cavity, said reciprocating means, casing and distributor defining a gas chamber;

passage means extending between the crank chamber of the engine and said gas chamber for communicating variations in magnitude of the crank chamber pressure to said gas chamber, said distributor selectively controlling communication of said passage means with said gas chamber; and one-way valve means disposed in said passage means for controlling the flow of gas within said passage means.

2. A lubricating oil pump according to claim 1, wherein: said passage means is comprised of a first and second passage for communicating, respectively, the positive and negative magnitudes of said crank chamber pressure into said gas chamber; said one-way valve means includes a first one-way valve arranged in the first passage to allow gas to flow only into the gas chamber and a second one-way valve arranged in the second passage to allow gas to flow only into the engine; and said distributor selectively communicates the first and second passages alternately with the gas chamber with a periodicity having a time interval greater than the periodicity of the rotational cycle of the engine.

3. A lubricating oil pump according to claim 2, wherein said pump means is connected to said reciprocating means so that the lubricating oil is sucked into said second cavity, when the distributor is communicating the first passage with the gas chamber.

4. A lubricating oil pump according to claim, 2 wherein: said pump means is connected to said reciprocating means so that the lubricating oil is sucked into said second cavity when the distributor is communicating the first passage with the gas chamber; said casing is provided with a first air port to permit said distributor to selectively communicate the gas chamber with the atmosphere; the distributor selectively communicates the gas chamber with the first passage, second passage and first air port, in this order; and said reciprocating means is elastically urged toward a preselected equilibrium position by means of an elastic member disposed within said axial cavity of said casing.

5. A lubricating oil pump according to claim 1, wherein said distributor is a single opening and closing valve selectively communicating said pump means with said passage means.

6. A lubricating oil pump according to claim 1, wherein, said axial cavity forms a cylindrical bore; said reciprocating means is a cylindrical piston which is disposed in said cylindrical bore formed in the casing said piston being in slideable contact with the cylindrical inner wall surface of the bore and being adapted for axially translation within said cylindrical bore.

7. A lubricating oil pump according to claim 4, wherein: said axial cavity forms a cylindrical bore said casing is provided with an oil inlet port, oil outlet port, a first port and a second port, said oil inlet and outlet ports and first air port being defined in the inner wall surface of said cylindrical bore formed in the casing; said distributor is rotatably disposed in the cylindrical bore formed in the casing, coupled to a rotary shaft which in turn is coupled to the internal combustion engine, and is provided with a cylindrical outer surface and a cylindrical inner surface, the cylindrical outer surface of said distributor being coaxial with the inner surface of said cylindrical bore and having an diameter substantially equal to the inner diameter of the cylindrical bore formed in the casing; said reciprocating means is a piston having a cylindrical outer surface which is in slideable contact with the inner wall surface of the cylindrical bore formed in the casing; and said distributor having ports selectively communicating with said ports formed in the casing; and said elastic member is a spring.

8. A lubricating oil pump according to claim 3, further comprising an air chamber defined by the casing and that end surface of said reciprocating means remote from the gas chamber said air chamber is substantially connected to the inlet pipe of the internal combustion engine so that pressure variations developed within the inlet pipe can be communicated to said air chamber.

9. A lubricating oil pump according to claim 8, wherein said air chamber is coupled to the inlet pipe of the engine by way of the third passage, which has a valve arranged therein.

10. A lubricating oil pump according to claim 2, wherein a first pressure accumulator chamber is arranged between the gas chamber and first one-way valve arranged in the first passage, and a second pressure accumulator chamber is arranged between the gas chamber and second one-way valve arranged in the second passage.

11. A lubricating oil pump according to claim 9, wherein said valve arrange in the third passage is a one-way valve which allows communication between said inlet pipe and with the air chamber when the absolute magnitude of negative pressure within said inlet pipe exceeds a predetermined value.

* * * * *